US012760436B2

(12) United States Patent
Rabe et al.

(10) Patent No.: US 12,760,436 B2
(45) **Date of Patent: *Oct. 13, 2026**

(54) SYSTEMS AND METHODS FOR ELECTRODEPOSITION OF TUNGSTEN DISULFIDE COATINGS

(71) Applicant: GM Global Technology Operations LLC, Detroit, MI (US)

(72) Inventors: Adam Paul Rabe, Auburn Hills, MI (US); Matthew G. Keast, Clawson, MI (US); Jacob Alexander Rabe, Auburn Hills, MI (US); Zhe Li, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 418 days.

This patent is subject to a terminal disclaimer.

(21) Appl. No.: 18/538,299

(22) Filed: Dec. 13, 2023

(65) Prior Publication Data

US 2025/0198034 A1 Jun. 19, 2025

(51) Int. Cl.

| | |
|---|---|
| ***C25D 3/02*** | (2006.01) |
| ***C01G 41/00*** | (2006.01) |
| ***C25D 9/06*** | (2006.01) |
| ***C25D 9/08*** | (2006.01) |

(52) U.S. Cl.

CPC ............... *C25D 3/02* (2013.01); *C01G 41/00* (2013.01); *C25D 9/06* (2013.01); *C25D 9/08* (2013.01)

(58) Field of Classification Search

CPC ........................................................ C25D 9/06

See application file for complete search history.

(56) References Cited

U.S. PATENT DOCUMENTS

| | | | |
|---|---|---|---|
| 2,902,417 | A | 9/1959 | Ingraham et al. |
| 3,591,472 | A | 7/1971 | Amsallem |
| 2025/0027223 | A1 | 1/2025 | Rabe et al. |

FOREIGN PATENT DOCUMENTS

| | | | |
|---|---|---|---|
| CN | 106811784 | A | 6/2017 |
| DE | 1282413 | B | 11/1968 |
| GB | 1313510 | A | 4/1973 |

OTHER PUBLICATIONS

Everett, Hayley, Preventing electrical erosion of bearings in EV drivetrains, Engineer Live, Dec. 5, 2022.

Harutyunyan, Vladimir, Electric Motor Bearing Types and Characteristics, HVH Industrial.

(Continued)

*Primary Examiner* — Brian W Cohen

(74) *Attorney, Agent, or Firm* — Vivacqua Crane, PLLC

(57) ABSTRACT

Systems, methods, and devices for electrodeposition of tungsten disulfide coatings are described. Electrodeposition of the coating includes coupling a power source to a surface of a substrate and to an electrode, immersing the surface of the substrate and the electrode into an aqueous solution, and forming a tungsten disulfide layer on the surface of the substrate. The surface is conductive, and the power source is a DC power source. The aqueous solution includes sodium metabisulfite, sodium tungstate, a surfactant, and a pH modifier. The tungsten disulfide layer is formed by applying, via the power source, a pulsed current to the surface of the substrate and the electrode in the aqueous solution and maintaining the pulsed current for a predetermined period of time.

20 Claims, 6 Drawing Sheets

(56) References Cited

OTHER PUBLICATIONS

Lee, Paul, Mind the BandGap—It's Gotten Wider!, Mouser Electronics, Mar. 6, 2020.
Roman, Matthew, Bearing damage . . . a lurking problem in electric cars, Vehicle Service Pros, Dec. 31, 2019.
Sextion, Brian, Understanding EV Wheel Hub Bearings, Brake & Front End, Apr. 18, 2022.
Wikipedia Contributors, Electric motor, Wikipedia, The Free Encyclopedia, Jul. 7, 2023, version ID 1163998184.
Zhang, Min, Demystifying EMC in an Electric Vehicle's Drive Unit, Interference Technology, Jul. 16, 2020, Articles, Automotive, Blog, Design, Design, News.

SYSTEMS AND METHODS FOR ELECTRODEPOSITION OF TUNGSTEN DISULFIDE COATINGS

INTRODUCTION

The disclosure relates to the field of tungsten disulfide coatings and, more specifically, to systems and methods for electrodeposition of tungsten disulfide coatings.

Tungsten disulfide is a dry-film lubricant coating with desirable properties, such as a low coefficient of friction, high wear life, high load rating, good affinity for lubricants, and good chemical inertness. The tungsten disulfide coating may be applied to substrates by chemical or physical deposition processes, including chemical vapor deposition, metal-organic chemical vapor deposition, and physical vapor deposition. These processes involve high cycle times and high costs to produce a coated substrate.

The tungsten disulfide coatings may also be applied by casting an admixture of tungsten disulfide and a polymer binder. These coatings are subject to degradation when exposed to elevated temperatures and may be incompatible with certain categories of wet lubricants. Therefore, there is a need in the art to optimize production tungsten disulfide thin films on components where wet lubrication is inadequate or not possible, such as high-temperature oxidative conditions.

SUMMARY

Systems, methods, and devices in accordance with the present disclosure provide for electrodeposition of tungsten disulfide coatings on surfaces of components.

Beneficially, the electrodeposition of tungsten disulfide coatings as described herein may enhance wear resistance of bearing surfaces, enhance tribological performance of components with or without use of wet lubricants, increase the operating temperatures in which the component may operate, enhance electrical and/or electronic properties of the component, combinations thereof, and the like. In some aspects, the tungsten disulfide coating enhances resistance to electrical discharge occurrence or effects. For example, one or more layers of tungsten disulfide may be provided with semiconductive properties on otherwise conductive surfaces of the component.

According to aspects of the present disclosure, a method includes coupling a power source to a surface of a substrate and to an electrode, immersing the surface of the substrate and the electrode into an aqueous solution, and forming a tungsten disulfide layer on the surface of the substrate. The surface is conductive, and the power source is a DC power source. The aqueous solution includes sodium metabisulfite, sodium tungstate, a surfactant, and a pH modifier. The tungsten disulfide layer is formed by applying, via the power source, a pulsed current to the surface of the substrate and the electrode in the aqueous solution and maintaining the pulsed current for a predetermined period of time.

According to further aspects of the present disclosure, the pulsed current is applied to the substrate in an amount of between 1 mA/cm$^2$ and 10 mA/cm2.

According to further aspects of the present disclosure, the predetermined period of time is between 5 minutes and 20 minutes; and the pulsed current has a pulse frequency and a pulse duty, the pulse frequency is less than 0.5 Hz and the pulse duty is less than 50%.

According to further aspects of the present disclosure, the pH modifier provides the aqueous solution with a pH of 6.0 to 9.0.

According to further aspects of the present disclosure, the pH modifier provides the aqueous solution with a pH of 6.0 to 7.5.

According to further aspects of the present disclosure, the pH modifier provides the aqueous solution with a pH of 7.5 to 9.0.

According to further aspects of the present disclosure, the aqueous solution further includes the sodium metabisulfite in an amount of at least 8 wt %, the sodium tungstate in an amount of at least 2 wt %, and the surfactant in an amount of at least 8 wt %.

According to further aspects of the present disclosure, the aqueous solution further includes the sodium metabisulfite in an amount of between 9 wt % and 20 wt %, the sodium tungstate in an amount of between 4 wt % and 10 wt %, and the surfactant in an amount of between 9 wt % and 20 wt %.

According to further aspects of the present disclosure, the tungsten disulfide layer, after removing the substrate from the aqueous solution, is between 1 μm and 2 μm.

According to further aspects of the present disclosure, the surface is a black oxide layer deposited on the substrate.

According to further aspects of the present disclosure, the tungsten disulfide layer is a first tungsten disulfide layer, the first tungsten disulfide layer has a first morphology, a second tungsten disulfide layer has a second morphology that is different from the first morphology, and forming the coated surface further includes forming a second tungsten disulfide layer on the first tungsten disulfide layer. The second tungsten disulfide layer is formed by adjusting a pH of the aqueous solution, applying a second pulsed current to the first tungsten disulfide layer and the electrode in the aqueous solution, and maintaining the pulsed current for a second predetermined period of time. The second pulsed current is applied via the power source.

According to aspects of the present disclosure, a component includes a coated surface formed by coupling a surface of the component to a power source, immersing the surface into an aqueous solution with an electrode, and forming a tungsten disulfide layer on the surface. The surface is conductive, and the power source is a DC power source. The aqueous solution includes sodium metabisulfite, sodium tungstate, a surfactant, and a pH modifier. The tungsten disulfide layer is formed by applying, via the power source, a pulsed current to the surface and the electrode in the aqueous solution and maintaining the pulsed current for a predetermined period of time. The pulsed current is applied such that such that the substrate acts as an anode.

According to further aspects of the present disclosure, the pulsed current is applied to the substrate in an amount of between 1 mA/cm$^2$ and 10 mA/cm2.

According to further aspects of the present disclosure, the pH modifier provides the aqueous solution with a pH of 6.0 to 7.5.

According to further aspects of the present disclosure, the aqueous solution further includes the sodium metabisulfite in an amount of between 9 wt % and 20 wt %, the sodium tungstate in an amount of between 4 wt % and 10 wt %, and the surfactant in an amount of between 9 wt % and 20 wt %.

According to further aspects of the present disclosure, the tungsten disulfide layer is a first tungsten disulfide layer, the first tungsten disulfide layer has a first morphology, a second tungsten disulfide layer has a second morphology that is different from the first morphology, and forming the coated surface further includes forming a second tungsten disulfide layer on the first tungsten disulfide layer. The second tungsten disulfide layer is formed by adjusting a pH of the aqueous solution, applying a second pulsed current to the first tungsten disulfide layer and the electrode in the aqueous solution, and maintaining the pulsed current for a second predetermined period of time. The second pulsed current is applied via the power source.

According to aspects of the present disclosure, a vehicle includes a first component that is movably engaged with a second component. The first component includes a coated surface that is in contact with the second component, the coated surface is formed by coupling a surface of the component to a power source, immersing the surface into an aqueous solution with an electrode, and forming a tungsten disulfide layer on the surface. The surface is conductive, and the power source is a DC power source. The aqueous solution includes sodium metabisulfite, sodium tungstate, a surfactant, and a pH modifier. The tungsten disulfide layer is formed by applying, via the power source, a pulsed current to the surface and the electrode in the aqueous solution and maintaining the pulsed current for a predetermined period of time to thereby form the coated surface. The pulsed current is applied such that the substrate acts as an anode.

According to further aspects of the present disclosure, the pH modifier provides the aqueous solution with a pH of 6.0 to 7.5.

According to further aspects of the present disclosure, the aqueous solution further includes the sodium metabisulfite in an amount of between 9 wt % and 20 wt %, the sodium tungstate in an amount of between 4 wt % and 10 wt %, and the surfactant in an amount of between 9 wt % and 20 wt %.

According to further aspects of the present disclosure, the tungsten disulfide layer is a first tungsten disulfide layer, the first tungsten disulfide layer has a first morphology, a second tungsten disulfide layer has a second morphology that is different from the first morphology, and forming the coated surface further includes forming a second tungsten disulfide layer on the first tungsten disulfide layer. The second tungsten disulfide layer is formed by adjusting a pH of the aqueous solution, applying a second pulsed current to the first tungsten disulfide layer and the electrode in the aqueous solution, and maintaining the pulsed current for a second predetermined period of time. The second pulsed current is applied via the power source.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

The following detailed description is merely exemplary in nature and is not intended to limit the application and uses. Furthermore, there is no intention to be bound by expressed or implied theory presented in the preceding introduction, summary, or brief description of the drawings or the following detailed description.

Figure 1:
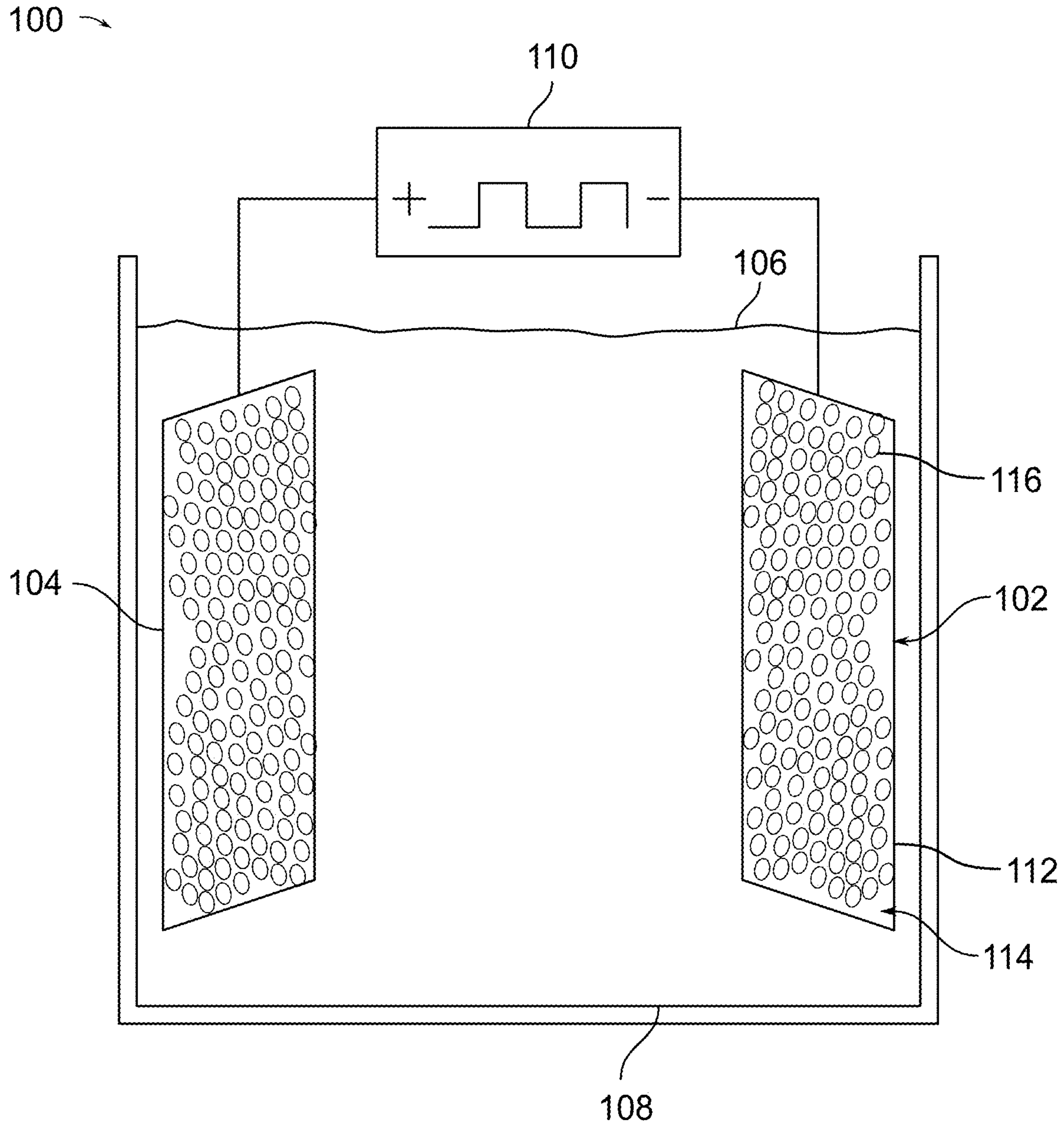
FIG. 1 illustrates an electrodeposition system for producing components with a tungsten disulfide coating, according to aspects of the present disclosure.

FIG. 1 illustrates an electrodeposition system 100 for producing components with a tungsten disulfide coating. The system includes a component 102, an electrode 104, and an aqueous solution 106 in a vessel 108. The system 100 further includes a power source 110 coupled to the component 102 and the electrode 104 via, for example, conductive wires.

The component 102 is an item or portion thereof that may be optimized with a layer of tungsten disulfide. The component 102 includes a substrate 112 and a surface 114. The substrate 112 may be electrically conductive, semi-conductive, or insulating. In some aspects, the substrate 112 is or includes pure metals or alloyed metals. For example, the substrate 112 may be or include Babbitt metals (e.g., lead Babbitt alloys and tin Babbitt alloys), bearing metals (e.g., 52100 steel), stainless steels, aluminum, aluminum alloy, bronze, brass, alloys thereof, combinations thereof, and the like. The substrate 112 may be the entire component and/or at least one coating on the component 102.

The surface is configured to receive the tungsten disulfide layer. The surface is electrically conductive and electrically coupled to the power source. In some aspects, the surface 114 is electrically coupled to the power source via the substrate 112. In some aspects, the surface 114 is electrically coupled to the power source while the substrate 112 is not.

The surface may include one or more features that are configured to optimize properties of the applied tungsten disulfide layer. For example, mechanical processes and/or chemical processes may be applied to the surface 114 prior to the electrodeposition to provide surface features that optimize properties of the applied tungsten disulfide layer. The optimized properties may include, for example, surface roughness, surface geometry, atomic composition, etc. For example, the surface 114 may be doped or coated with a passivating agent to inhibit chemical or dimensional changes at the surface 114. In some aspects, the surface 114 includes a black oxide ($Fe_3O_4$) layer. In some aspects, the black oxide layer is between 1 μm and 2 μm.

In some aspects, the component 102 is incorporated into a vehicle, such as an electric vehicle. The component 102 may be, for example, a bearing component or a slidable component. Example bearing components include a journal bearing, roller bearing, ball bearing, linear bearing, combinations thereof, and the like. For example, the component 102 may be a bearing that is configured to support a rotatable shaft or portions thereof. The bearing may include, for example, races (e.g., inner and outer races), rollers (e.g., cylindrical, spherical, needle, or tapered rollers), and bearing surfaces (e.g., inner and outer bearing surfaces), and the tungsten disulfide coating may be applied to one or more selected components or every component.

Example slidable components include an actuator pin (e.g., a turbocharger wastegate pin or a lift-arm pin), an intake valve, an exhaust valve, a sheave, and the like. The tungsten disulfide layer may be selectively applied to certain bearing surfaces of the slidable components while other bearing surfaces do not include the coating. For example, the tungsten disulfide layer may be deposited on a surface configured to slidably an adjacent component while not being deposited on a surface configured to form a seal with an adjacent component.

The electrode 104 allows for a current to pass through the surface 114 of the component 102 during the electrodeposition. The electrode 104 includes a compatible material that is resistant to electrochemical oxidation. The compatible material may be or include, for example, a stainless-steel alloy (e.g., 304L), noble metals (e.g., platinum, rhodium, indium) clad titanium, an inert material, combinations thereof, and the like. The electrode 104 may also include a shaped surface that is configured to enhance uniformity of the applied tungsten disulfide layer. For example, the shaped surface may be complementary to a shape defined by the surface 114 of the component 102.

The power source is configured to provide a desired current to the component 102 and the electrode 104 to produce an electrodeposited tungsten disulfide layer on the component 102. The power source may include or be coupled to a controller that is configured to control actuation and/or operation of the power source. For example, the controller may be configured to provide at least one desired operating parameter by monitoring and/or controlling values of one or more values that are functionally related to the desired operating parameters. In some aspects, the target operating parameter may be a desired current density, and the controller may alter an applied voltage to provide the desired current density.

The power source may be, for example, a DC power source configured to provide a direct current. In some aspects, the power source may be further configured to provide a pulsed current. The pulsed current may be, for example, an intermittent applied current, an inversion of current flow, combinations thereof, and the like. The pulsed current includes a pulse frequency and a pulse duty. The pulse frequency is the duration of a cycle, and the pulse duty is a fraction of the cycle that includes an applied current and/or non-inverted current.

The aqueous solution 106 includes an ionic sulfur source, an ionic tungsten source, a surfactant, and, optionally, a pH modifier.

The ionic tungsten source is configured to provide tungsten to the electrodeposited tungsten disulfide layer. In some aspects, the ionic tungsten source is sodium tungstate. While not being bound by theory, it is believed that the tungstate ion ($WO_4^{2-}$) provides beneficial kinetic and/or thermodynamic properties that optimize the deposited tungsten disulfide layer. In some aspects, the moiety of the ionic tungsten source is selected based on the moiety of the ionic sulfur source to further optimize the deposited tungsten disulfide layer. While not being bound by theory, the ionic tungsten source is present in an amount above that which tungsten disulfide is deposited at a desired rate during operation and in an amount below that which promotes defects in the deposited layer, such as pure metal defects. In some aspects, the ionic tungsten source is present in an amount of at least 2 wt %. In some further aspects, the ionic tungsten source is present in an amount of between 4 wt % and 10 wt %.

The ionic sulfur source is configured to provide sulfur to the electrodeposited tungsten disulfide layer. In some aspects, the ionic sulfur source is sodium metabisulfite. While not being bound by theory, it is believed that the bisulfite ion ($HSO_3^-$) in solution provides beneficial kinetic and/or thermodynamic properties that optimize properties of the deposited tungsten disulfide layer.

While not being bound by theory, the ionic sulfur source is present in amount above that which, in combination with the ionic tungsten source, promotes tungsten disulfide deposition at a desired rate during operation and in an amount below that which promotes defects in the deposited layer. In some aspect, the ionic sulfur source is present in an amount of at least 8 wt %. In some further aspects, the ionic sulfur source is present in an amount of between 9 wt % and 20 wt %.

The surfactant is configured to decrease surface tension between the aqueous solution 106 and the surface 114 of the component 102. The surface tension is selected to optimize a geometry of bubbles 116 generated on the surface 114 of the component 102 during electrodeposition.

In some aspects, the surfactant is an anionic surfactant. The anionic surfactant may include a head with one or more tails. The head may be an anionic functional group. The anionic functional group may include, for example, sulfate, sulfonate, phosphate, carboxylates, combinations thereof, and the like. The tail may be hydrocarbon chains. The chains may be linear or branched and may be aliphatic or aromatic chains. The anionic surfactant may be, for example, TEEPOL™ 610S.

The surfactant is present in an amount sufficient to provide a desired bubble 116 geometry during electrodeposition of the tungsten disulfide layer. In some aspects, the surfactant is present in amount of at least 8 wt %. In further aspects, the surfactant is present in amount of between 9 wt % and 20 wt %.

The pH modifier is added to the aqueous solution 106 to bring the pH of the aqueous solution 106 to a desired level. In some aspects, the pH of the aqueous solution 106 is between 6.0 and 9.0.

The pH is selected to provide a desired morphology of the electrodeposited tungsten disulfide layer. In some aspects, the pH of the aqueous solution 106 is selected to provide a first morphology that optimizes tribological performance. For example, the first morphology may be a randomly oriented morphology that optimizes dry lubrication and/or retention of a lubricating fluid within voids between tungsten disulfide particles, such as platelets or nanoflakes of tungsten disulfide. In some further aspects, the pH of the aqueous solution 106 is selected to provide a second morphology that optimizes electronic properties. For example, the second morphology may be a two-dimensional ordered morphology that provides semi-conductive properties with a desired band gap. In some aspects, the band gap is at least 1.32 eV. In some further aspects, the band gap is 2.03 eV. Beneficially, the band gap may be selected to optimize longevity of the component 102 and/or the tungsten disulfide layer when the component is exposed to parasitic currents generated by, for example, electric drive units The first morphology may be produced or optimized by, for example, adjusting the pH of the aqueous solution 106 to between 6.0 and 7.5. In some examples, the first morphology optimizes tribological performance by being configured in a randomly ordered morphology. The randomly ordered morphology may include randomly ordered platelets or nanoflakes of tungsten disulfide.

The second morphology may be produced or optimized by, for example, adjusting the pH of the aqueous solution 106 to between 7.5 and 9.0. In some examples, the second morphology optimizes electronic properties by being configured in a two-dimensional ordered morphology. The two-dimensional ordered morphology may include at least one tungsten disulfide crystal in a generally planar microstructure. In some aspects, the tungsten disulfide layer includes a plurality of monolayers, each of which includes the two-dimensional ordered morphology.

The pH modifier maybe either an acid or a base. Acidic pH modifiers may include, for example, citric acid (HOC$(CO_2H)(CH_2CO_2H)_2$), ascorbic acid ($C_6H_8O_6$), acetic acid ($CH_3COOH$), tartaric acid (2,3-dihydroxybutanedioic acid), phosphoric acid ($H_3PO_4$), sulfuric acid ($H_2SO_4$), combinations thereof, and the like. Basic pH modifiers may include, for example, pyridine ($C_5H_5N$), methylamine ($CH_3NH_2$), imidazole ($C_3N_2H_4$), benzimidazole ($C_7H_6N_2$), ammonia ($NH_3$), inorganic hydroxides (e.g., NaOH, KOH, $Mg(OH)_2$, etc.), combinations thereof, and the like.

Figure 2:
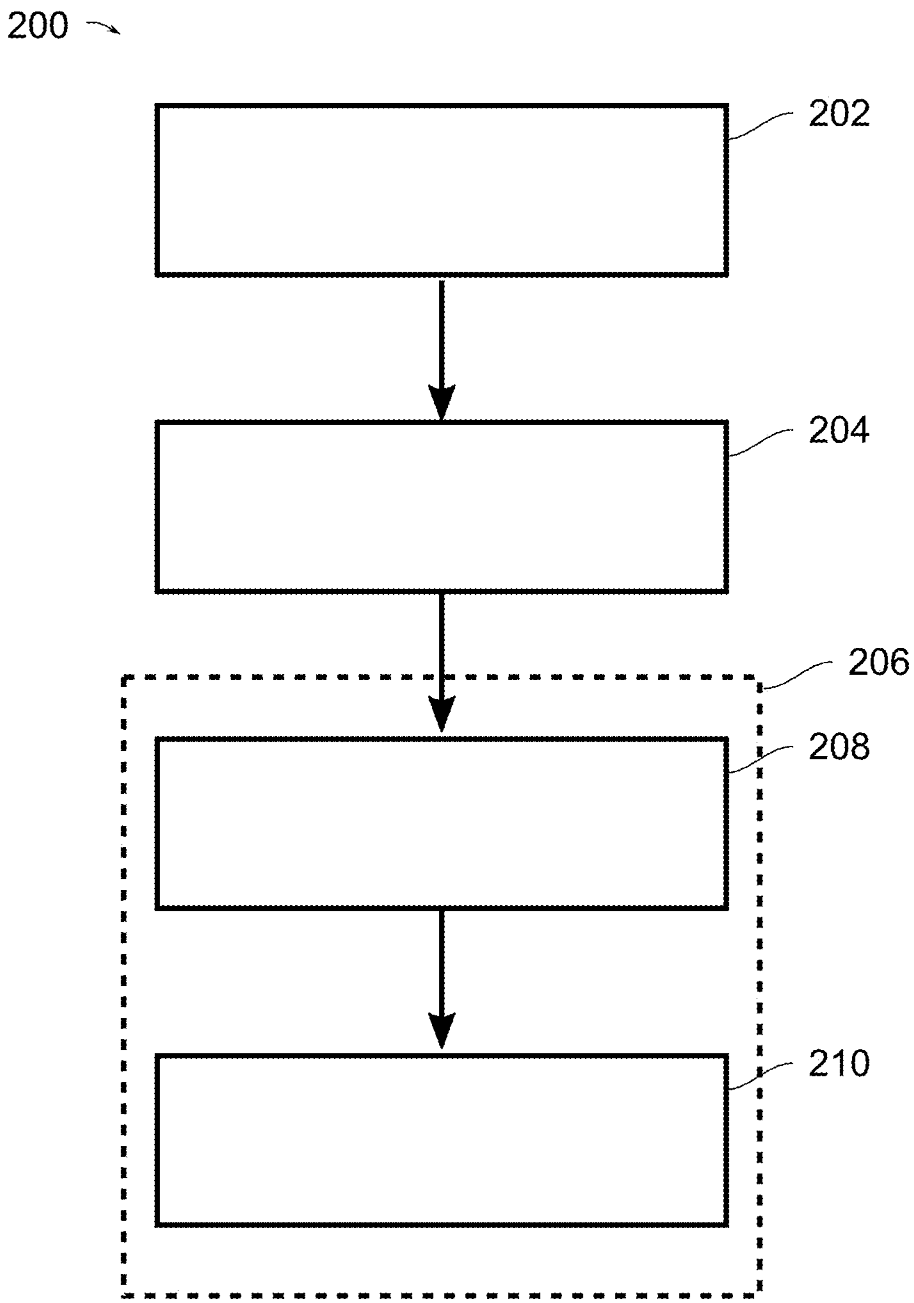
FIG. 2 illustrates an example method of electrodepositing a tungsten disulfide layer on a component, according to aspects of the present disclosure.

FIG. 2 illustrates an example method 200 of electrodepositing a tungsten disulfide layer on a component. At block 202, the power source is coupled to a surface 114 of a substrate 112 and to an electrode 104. The surface 114 may optionally be cleaned and/or treated to provide one or more desired surface properties. For example, the surface 114 may be treated using chemical and/or physical processes that provide desired surface features to optimize properties of the tungsten disulfide coating. The desired surface features may be a desired roughness, morphology, or chemical property. In some aspects, the surface 114 is treated to optimize current distribution across the surface 114 to thereby optimize desired properties of the resulting tungsten disulfide coating. In some aspects, the surface 114 is treated to optimize an interface between the substrate 112 and the resulting tungsten disulfide layer.

At block 204, the surface 114 of the substrate 112 and the electrode 104 are immersed in an aqueous solution 106. The tungsten disulfide layer is then formed at block 206. Forming the tungsten disulfide layer includes, at block 208, applying a pulsed current and, at block 210, maintaining the pulsed current for a predetermined period of time.

The pulsed current is applied to the surface 114 of the substrate 112 and the electrode 104 while immersed in the aqueous solution 106. When applied, the current causes the electrode 104 to act as an anode the surface 114 to act as a cathode. Features of the pulsed current may be selected and maintained to provide desired grain properties of the deposited tungsten disulfide layer. The features may include, for example, current density, pulse frequency, and pulse duty.

The current density may be selected to, for example, optimize a depositional flux and/or a uniformity of the tungsten disulfide layer. In some aspects, the current density is from 1 $mA/cm^2$ to 10 $mA/cm^2$. The pulsed current is selected, at least in part, to provide a desired flux of tungsten disulfide being deposited on the surface 114. For example, while not being bound by theory, it is believed that current below 1 $mA/cm^2$ may require an impracticable time period to deposit the tungsten disulfide layer or may not deposit the tungsten disulfide layer in the desired morphology and/or uniformity. In further examples, while not being bound by theory, it is believed that current exceeding 10 $mA/cm^2$ promotes increased defects in the tungsten disulfide lattice, decreased uniformity of the desired morphology, and/or deposition of pure tungsten grains on the surface 114 or within the layer.

The pulse frequency may be selected to, for example, optimize a crystal size of the tungsten disulfide layer. In some aspects, the pulse frequency is less than 0.5 Hz, (e.g., the pulse cycle may repeat every two seconds or more). In some further aspects, the pulse frequency is less than 0.34 Hz (e.g., the pulse cycle may repeat every three seconds or more).

The pulsed current may be applied with a pulse duty that is selected to optimize the surface 114 quality of the tungsten disulfide layer by optimizing, for example, nucleation rate, grain growth and sizing, and grain refinement.

In some aspects, the pulse duty is less than 50%. For example, for a pulse cycle of two seconds, the current may be applied for one second and not applied for one second. In some further aspects, the pulse duty is less than 34%. For example, for a pulse cycle of three seconds, the current may be applied for one second and not applied for two seconds.

The predetermined period of time is selected to provide a predetermined thickness of the tungsten disulfide layer at the selected operating parameters. In some aspects, the thickness is between 1 μm and 2 μm. In some aspects, the predetermined period of time is between 5 minutes and 20 minutes.

In some aspects, a first tungsten disulfide layer is deposited with the first morphology atop a second tungsten disulfide layer that was deposited with the second morphology. Beneficially, multiple tungsten disulfide layers may optimize both electronic and tribological properties of the component 102. In some further aspects, the first tungsten disulfide layer and the second tungsten disulfide layer may be deposited using the same aqueous solution 106. For example, the first tungsten disulfide layer may be deposited at a first pH, and then a pH adjuster may be added to the aqueous solution 106 to change the pH to a second pH for deposition of the second layer.

In some aspects, the method repeats block 206 to form at least one additional tungsten disulfide layer on top of the previous tungsten disulfide layer. The pH of the aqueous solution may be adjusted to a second pH prior to applying a second pulsed current at block 208 and maintaining the second pulsed current for a second predetermined period of time at block 210. The pH may be adjusted such that a first of the tungsten disulfide layers and a second of the tungsten disulfide layers have different morphologies.

Optionally, the aqueous solution may be conditioned during formation of the tungsten disulfide layer to optimize uniformity or other properties of the tungsten disulfide layer. The conditioning may include, for example, maintaining a temperature, agitation, or composition of the aqueous solution 106.

While not being bound by theory, it is believed that electrodeposition of the tungsten disulfide layer in method 200 proceeds through the following reactions:

$$SO^{2-}_{3(aq)} + 6H^+ + 2e^- \rightarrow S^{2-}_{(aq)} + 3H_2O \quad (1)$$

$$WO^{2-}_{4(aq)} + 6S^{2-}_{(aq)} + 12H^+ \rightarrow WS^{2-}_{4(aq)} + 4H_2O + 2H_2S \quad (2)$$

$$WS^{2-}_{4(aq)} + 6H^+ + 2e^- \rightarrow WS_{2(s)} + 2H_2S + H_{2(g)} \quad (3)$$

FIGS. 3-6 illustrate backscatter electron detector composite images ("BED-C images") of a scanning electron microscope for example electrodeposited tungsten disulfide layers on bearing steels.

Figure 3:
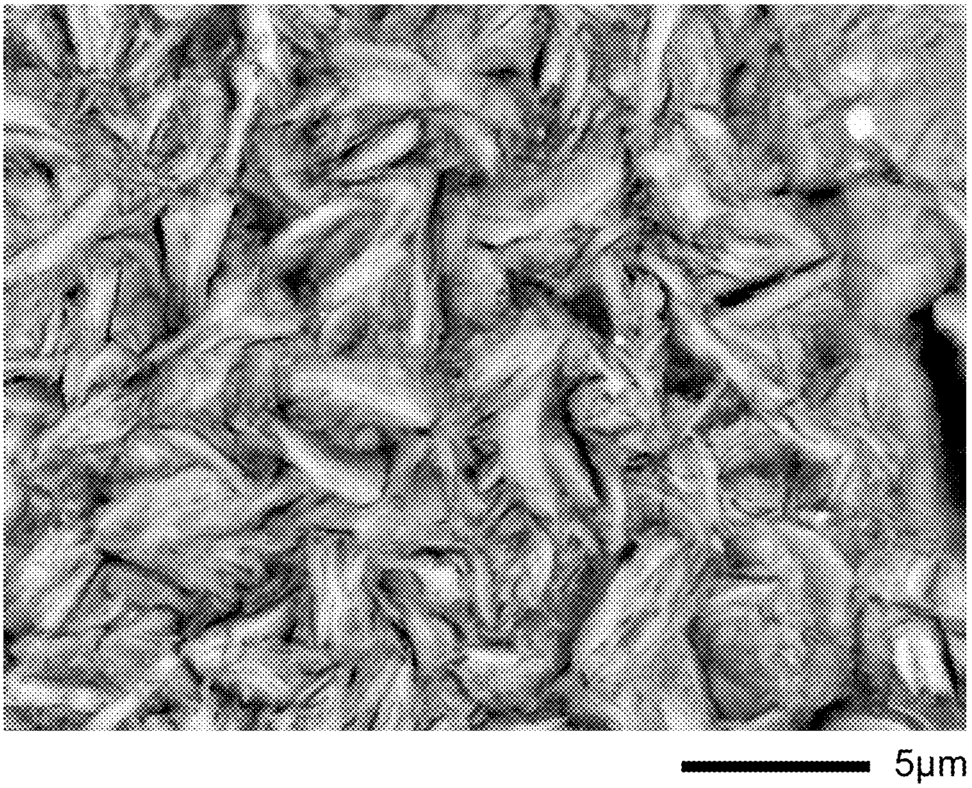
FIG. 3 illustrates a BED-C image of a first tungsten disulfide layer, according to aspects of the present disclosure.

FIG. 3 illustrates a BED-C image of a first tungsten disulfide layer formed by systems and methods described above with the aqueous solution 106 at 6.5 pH. The aqueous solution 106 was 10 wt % sodium metabisulfite, 5 wt % sodium tungstate, and 10 wt % TEEPOL™ 610S. A DC power source was configured to apply 3 mA/cm$^2$ of current to the sample, and the voltage was floated to maintain the applied current. The DC power source was further configured to pulse the applied current at a pulse frequency of 0.33 Hz and a pulse duty of 0.33. The image was produced under high vacuum with a 15.0 kV accelerating voltage is magnified 5,000×.

Figure 4:
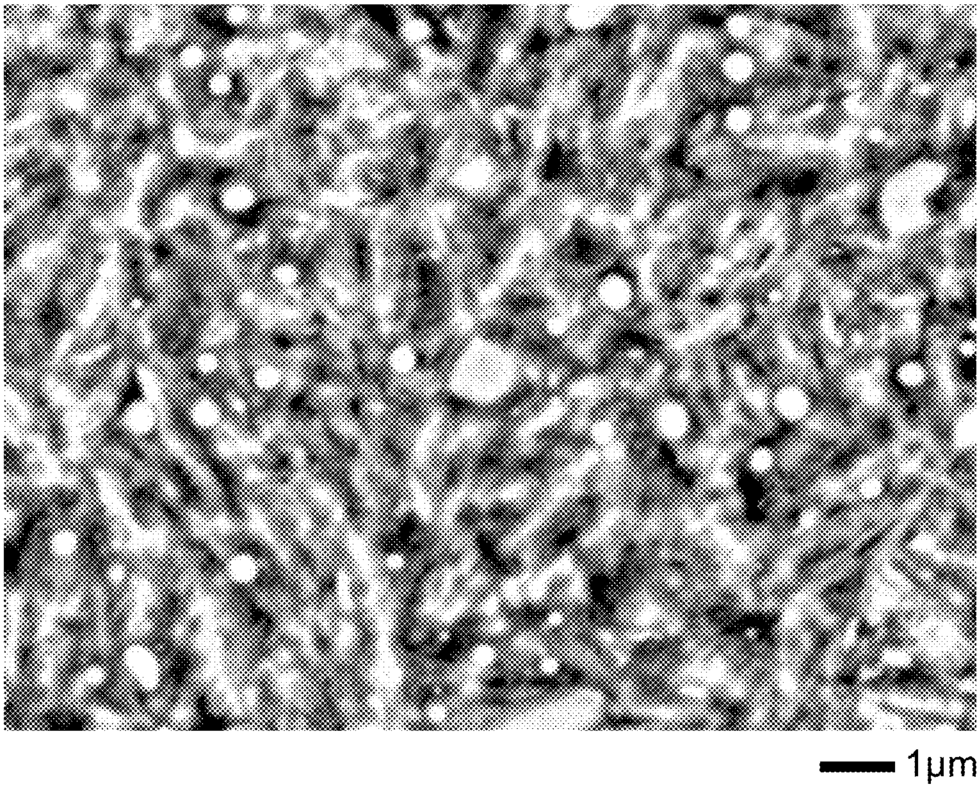
FIG. 4 illustrates a BED-C image of a second tungsten disulfide layer, according to aspects of the present disclosure.

FIG. 4 illustrates a BED-C image of a second tungsten disulfide layer formed by systems and methods described above with the aqueous solution 106 at 6.5 pH. The aqueous solution 106 was 10 wt % sodium metabisulfite, 5 wt % sodium tungstate, and 10 wt % TEEPOL™ 610S. A DC power source was configured to apply 3 mA/cm$^2$ of current to the sample, and the voltage was floated to maintain the applied current. The DC power source was further configured to pulse the applied current at a pulse frequency of 0.33 Hz and a pulse duty of 0.33. The image was produced with a 10.0 kV accelerating voltage and is magnified 10,000×.

Figure 5:
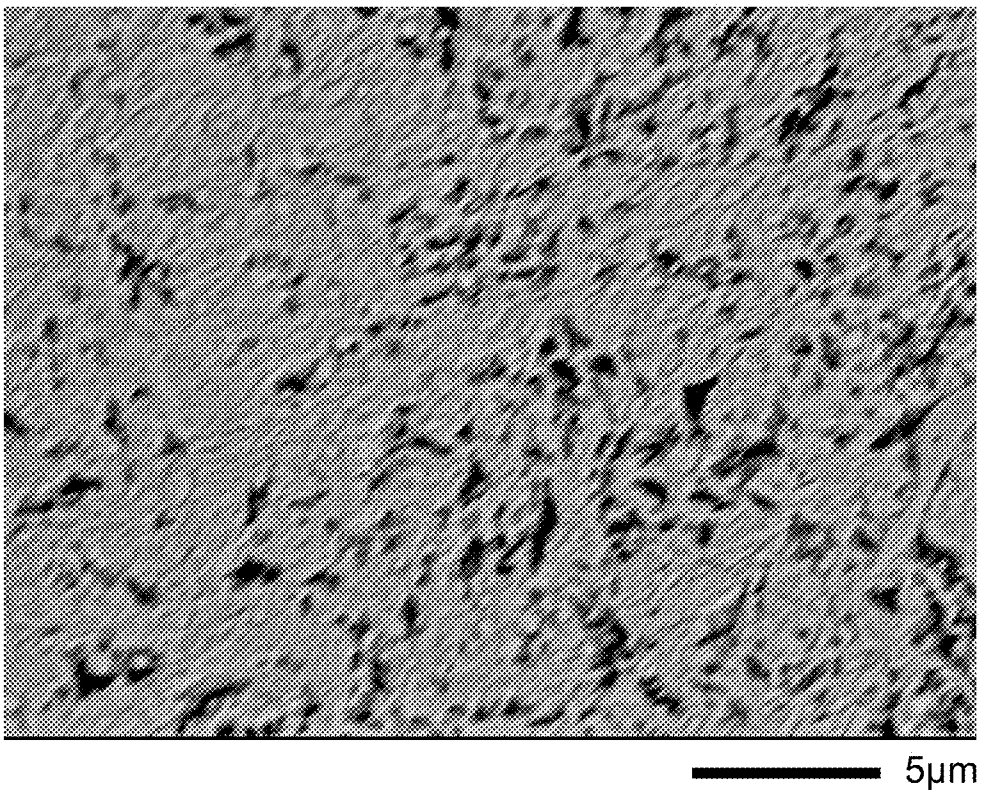
FIG. 5 illustrates a BED-C image of a third tungsten disulfide layer, according to aspects of the present disclosure.

FIG. 5 illustrates a BED-C image of a tungsten disulfide layer formed by systems and methods described above with the aqueous solution 106 at 8.5 pH. The aqueous solution 106 was 10 wt % sodium metabisulfite, 5 wt % sodium tungstate, and 10 wt % TEEPOL™ 610S. A DC power source was configured to apply 3 mA/cm$^2$ of current to the sample, and the voltage was floated to maintain the applied current. The DC power source was further configured to pulse the applied current at a pulse frequency of 0.33 Hz and a pulse duty of 0.33. The image was produced with a 10.0 kV accelerating voltage and is magnified 5,000×.

Figure 6:
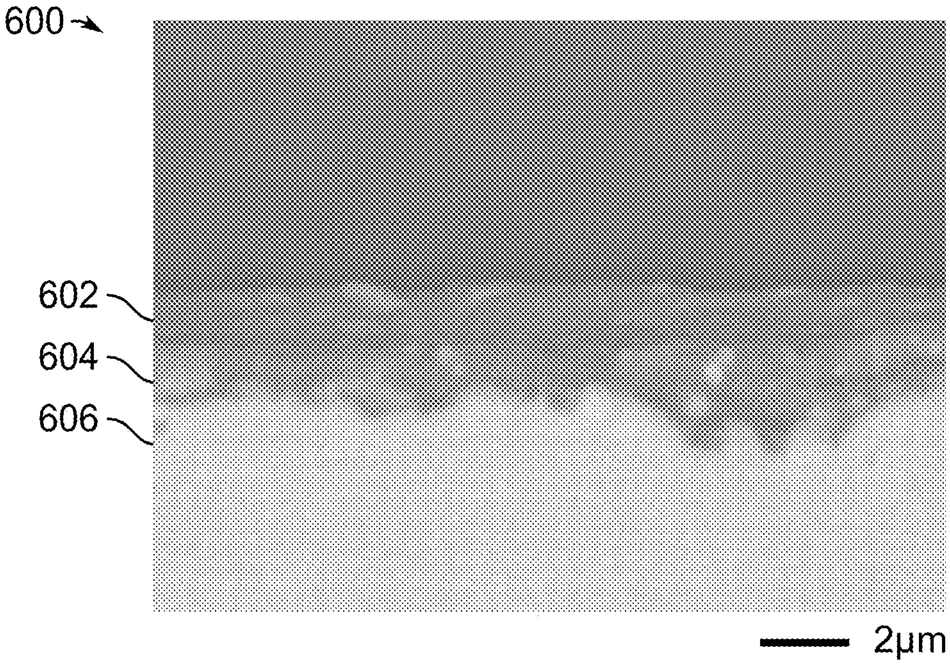
FIG. 6 illustrates a BED-C image of a fourth tungsten disulfide layer, according to aspects of the present disclosure.
Figure 7:
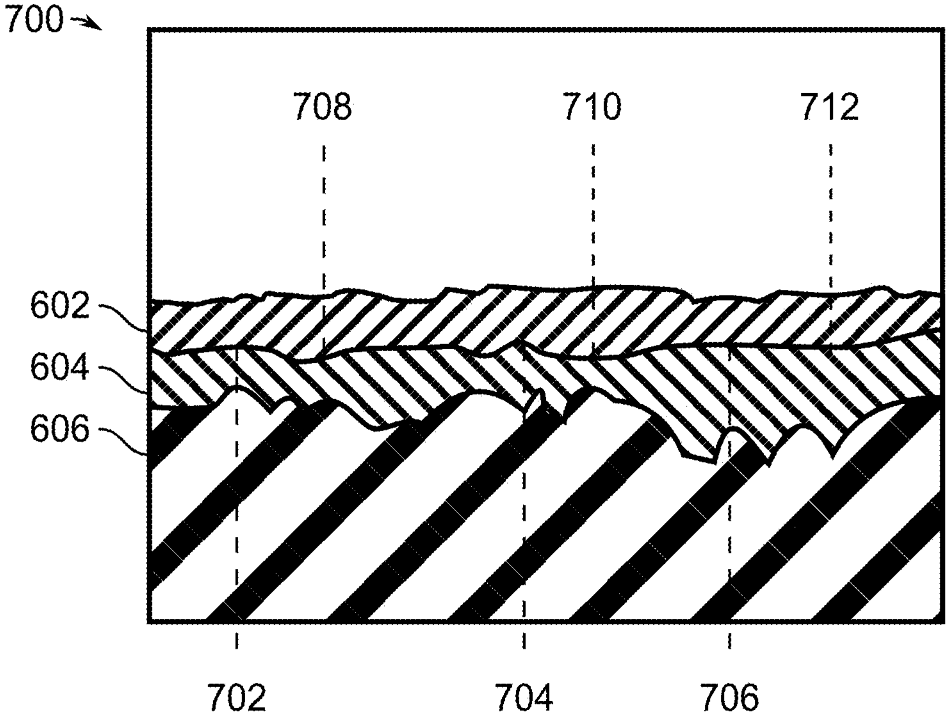
FIG. 7 illustrates a schematic representation of the SEM image of FIG. 6.

FIGS. 6 and 7 illustrate an image 600 and schematic 700 of a cross-section of a tungsten disulfide layer 602 formed by systems and methods described above with the aqueous solution 106 at 8.5 pH. FIG. 6 is a BED-C image produced under high vacuum with a 20.0 kV accelerating voltage that is magnified 7,000×. The cross-section 600 illustrates the tungsten disulfide layer 602, black oxide layer 604, and substrate 606. The black oxide layer 604 measures about 1.185 μm at indicator 702, about 1.261 μm at indicator 704, and about 1.815 μm at indicator 706. The tungsten disulfide layer 602 measures about 1.624 μm at indicator 708, about 1.509 μm at indicator 710, and about 1.226 μm at indicator 712. Beneficially, as can be seen, the electrodeposition of the tungsten disulfide layer may provide a surface having reduced roughness from underlying layers, such as the substrate 602.

As understood by one of skill in the art, the present disclosure is susceptible to various modifications and alternative forms, and some representative embodiments have been shown by way of example in the drawings and described in detail above. It should be understood, however, that the novel aspects of this disclosure are not limited to the particular forms illustrated in the appended drawings. Rather, the disclosure is to cover modifications, equivalents, combinations, sub-combinations, permutations, groupings, and alternatives falling within the scope and spirit of the disclosure and as defined by the appended claims.

As used herein, unless the context clearly dictates otherwise: the words "and" and "or" shall be both conjunctive and disjunctive, unless the context clearly dictates otherwise; the word "all" means "any and all" the word "any" means "any and all"; the word "including" means "including without limitation"; and the singular forms "a", "an", and "the" includes the plural referents and vice versa.

Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. The numerical parameters set forth herein and in the attached claims are approximations that may vary depending upon the desired properties sought to be obtained by the present disclosure. At the very least, and not as an attempt to limit the application of the doctrine of equivalents to the scope of the claims, each numerical parameter should at least be construed in view of the number of reported significant digits and by applying ordinary rounding techniques.

Words of approximation, such as "approximately," "about," "substantially," and the like, may be used herein in the sense of "at, near, or nearly at," "within 0-10% of," or "within acceptable manufacturing tolerances," or a logical combination thereof, for example.

While the metes and bounds of the term "about" are readily understood by one of ordinary skill in the art, the term "about" indicates that the stated numerical value or property allows imprecision. If the imprecision provided by "about" is not otherwise understood in the art with this ordinary meaning, then "about" indicates at least variations that may arise from ordinary methods of measuring and using such parameters. For example, if not otherwise understood in the art, the term "about" means within 10% (e.g., +10%) of the stated value.

While the metes and bounds of the term "substantially" are readily understood by one of ordinary skill in the art, the term "substantially" indicates that the stated numerical value or property allows some imprecision. If the imprecision provided by "substantially" is not otherwise understood in the art with this ordinary meaning, then "substantially" indicates at least variations that may arise from manufacturing processes and measurement of such parameters. For example, if not otherwise understood in the art, the term "substantially" means within 5% (e.g., +5%) of the stated value.

While the metes and bounds of the term "essentially" are readily understood by one of ordinary skill in the art, the term "essentially" indicates that the stated numerical value or property allows some slight imprecision. If the imprecision provided by "essentially" is not otherwise understood in the art with this ordinary meaning, then "essentially" indicates at least negligible variations in desired parameters that may be impracticable to overcome. For example, if not otherwise understood in the art, the term "essentially" means within 1% (e.g., +1%) of the stated value.

While the metes and bounds of the term "pure" are readily understood by one of ordinary skill in the art, the term "pure" indicates that the compound may include very slight traces of other materials. If the imprecision provided by "pure" is not otherwise understood in the art with this ordinary meaning, then "pure" indicates at least variations that may arise from separation processes and measurement of such parameters. For example, if not otherwise understood in the art, the term "pure" means above 99.9% of the stated material.

It is to be understood that the ranges provided herein include the stated range, subranges within the stated range, and each value within the stated range.

While the best modes for carrying out the disclosure have been described in detail, those familiar with the art to which this disclosure relates will recognize various alternative designs and embodiments for practicing the disclosure within the scope of the appended claims.

While the best modes for carrying out the disclosure have been described in detail, those familiar with the art to which this disclosure relates will recognize various alternative designs and embodiments for practicing the disclosure within the scope of the appended claims.

What is claimed is:

1. A method comprising:
- coupling a power source to a surface of a substrate and to an electrode, the surface being conductive, the power source being a DC power source;
- immersing the surface of the substrate and the electrode into an aqueous solution, the aqueous solution including sodium metabisulfite, sodium tungstate, a surfactant, and a pH modifier; and
- forming a tungsten disulfide layer on the surface of the substrate by:
  - applying, via the power source, a pulsed current to the surface of the substrate and the electrode in the aqueous solution; and
  - maintaining the pulsed current for a predetermined period of time.

2. The method of claim 1, wherein the pulsed current is applied to the substrate in an amount of between 1 $mA/cm^2$ and 10 $mA/cm^2$.

3. The method of claim 2, wherein:
- the predetermined period of time is between 5 minutes and 20 minutes; and
- the pulsed current has a pulse frequency and a pulse duty, the pulse frequency being less than 0.5 Hz and the pulse duty is less than 50%.

4. The method of claim 1, wherein the pH modifier provides the aqueous solution with a pH of 6.0 to 9.0.

5. The method of claim 4, wherein the pH modifier provides the aqueous solution with a pH of 6.0 to 7.5.

6. The method of claim 4, wherein the pH modifier provides the aqueous solution with a pH of 7.5 to 9.0.

7. The method of claim 4, wherein the aqueous solution further comprises:
- the sodium metabisulfite in an amount of at least 8 wt %, the sodium tungstate in an amount of at least 2 wt %, and the surfactant in an amount of at least 8 wt %.

8. The method of claim 4, wherein the aqueous solution further comprises:
- the sodium metabisulfite in an amount of between 9 wt % and 20 wt %,
- the sodium tungstate in an amount of between 4 wt % and 10 wt %, and
- the surfactant in an amount of between 9 wt % and 20 wt %.

9. The method of claim 1, wherein the tungsten disulfide layer, after removing the substrate from the aqueous solution, is between 1 μm and 2 μm.

10. The method of claim 1, wherein the surface is a black oxide layer deposited on the substrate.

11. The method of claim 1, wherein the tungsten disulfide layer is a first tungsten disulfide layer, the first tungsten disulfide layer has a first morphology, a second tungsten disulfide layer has a second morphology that is different from the first morphology, and the method further comprises:
- forming a second tungsten disulfide layer on the first tungsten disulfide layer by:
  - adjusting a pH of the aqueous solution;
  - applying, via the power source, a second pulsed current to the first tungsten disulfide layer and the electrode in the aqueous solution; and
  - maintaining the second pulsed current for a second predetermined period of time.

12. The method of claim 1, wherein the substrate is a babbitt metal.

13. The method of claim 11, wherein the pH of the aqueous solution while forming the first tungsten disulfide layer is 6.0 to 7.5 and the pH of the aqueous solution is adjusted to a second pH of 7.5 to 9.0 while forming the second tungsten disulfide layer.

14. The method of claim 1, wherein the electrode includes a shaped surface and the shaped surface exhibits a complementary shape to the surface of the substrate.

15. The method of claim 1, wherein the electrode includes one of a stainless-steel alloy, a noble metal, a clad titanium, and combinations thereof.

16. The method of claim 1, further comprising adjusting a pH with the pH modifier to provide one of a) a randomly oriented morphology of the tungsten disulfide layer including one of platelets of tungsten disulfide and nanoflakes of tungsten disulfide and b) an ordered morphology of the tungsten disulfide layer including at least one tungsten disulfide crystal in a generally planar structure.

17. A method, comprising:
- coupling a power source to a surface of a substrate and to an electrode, the surface being conductive, the power source being a DC power source;
- immersing the surface of the substrate and the electrode into an aqueous solution, the aqueous solution including sodium metabisulfite in an amount of between 9 wt % and 20 wt %, sodium tungstate in an amount of between 4 wt % and 10 wt %, a surfactant in an amount of between 9 wt % and 20 wt %, and a pH modifier; and
- forming a tungsten disulfide layer on the surface of the substrate by:
  - applying, via the power source, a pulsed current to the surface of the substrate and the electrode in the aqueous solution; and
  - maintaining the pulsed current for a predetermined period of time,
- wherein the tungsten disulfide layer, after removing the substrate from the aqueous solution, is between 1 μm and 2 μm.

18. The method of claim 17, wherein the surface is a black oxide layer deposited on the substrate.

19. A method, comprising:
- coupling a power source to a surface of a substrate and to an electrode, the surface being conductive, the power source being a DC power source;
- immersing the surface of the substrate and the electrode into an aqueous solution, the aqueous solution including sodium metabisulfite in an amount of between 9 wt % and 20 wt %, sodium tungstate in an amount of between 4 wt % and 10 wt %, a surfactant in an amount of between 9 wt % and 20 wt %, and a pH modifier;
- forming a first tungsten disulfide layer on the surface of the substrate by:

applying, via the power source, a first pulsed current to the surface of the substrate and the electrode in the aqueous solution, and maintaining the first pulsed current for a first predetermined period of time; and forming a second tungsten disulfide layer on the first tungsten disulfide layer by:

adjusting a pH of the aqueous solution from between 6.0 to 7.5 to between 7.5 to 9.0, applying, via the power source, a second pulsed current to the first tungsten disulfide layer and the electrode in the aqueous solution, and maintaining the second pulsed current for a second predetermined period of time.

20. The method of claim 19, wherein the first tungsten disulfide layer exhibits a randomly oriented morphology including one of platelets of tungsten disulfide and nanoflakes of tungsten disulfide, and the second tungsten disulfide layer exhibits an ordered morphology including at least one tungsten disulfide crystal in a generally planar structure.

* * * * *